United States Patent
Ozyboyd (12)

(10) Patent No.: US 6,569,338 B1
(45) Date of Patent: *May 27, 2003

(54) INTEGRATED VERTICAL WASTEWATER TREATMENT VESSEL AND METHOD

(76) Inventor: Boris Ozyboyd, 1513 Glenleaf Dr., Norcross, GA (US) 30092-6114

( * ) Notice: Subject to any disclaimer, the term of this patent is extended or adjusted under 35 U.S.C. 154(b) by 0 days.

This patent is subject to a terminal disclaimer.

(21) Appl. No.: 09/592,755

(22) Filed: Jun. 13, 2000

Related U.S. Application Data

(63) Continuation-in-part of application No. 09/385,662, filed on Aug. 26, 1999, now Pat. No. 6,120,687.

(51) Int. Cl.⁷ .................................................. C02F 3/20
(52) U.S. Cl. .................... 210/624; 210/626; 210/195.4; 210/256; 210/262; 210/197
(58) Field of Search ......................... 210/620, 623, 210/626, 629, 195.3, 195.4, 207, 220, 256, 258, 259, 260, 261, 262, 521, 624, 197

(56) References Cited

U.S. PATENT DOCUMENTS

| | | | |
|---|---|---|---|
| 272,881 A | 2/1883 | Houghton | |
| 332,610 A | 12/1885 | James | |
| 476,737 A | 6/1892 | Deutsch | |
| 497,856 A | 5/1893 | Brown | |
| 770,019 A | 9/1904 | Neireiter | |
| 1,456,759 A | 5/1923 | Booth | |
| 1,606,990 A | 11/1926 | Funk | |
| 1,700,722 A | * 1/1929 | Imhoff | 210/624 |
| 2,135,860 A | 11/1938 | Taysen | 61/11 |
| 2,630,749 A | 3/1953 | Ball et al. | 99/240 |
| 2,717,774 A | 9/1955 | Obma | 261/121 |
| 3,473,665 A | 10/1969 | Duff | 210/207 |
| 3,722,686 A | 3/1973 | Arnett et al. | 210/170 |
| 3,779,910 A | 12/1973 | Chatfield | 210/195.4 |
| 3,828,933 A | 8/1974 | Hampton et al. | 210/195 |
| 4,075,102 A | 2/1978 | Ferrin | 210/277 |
| 4,094,790 A | 6/1978 | Schmidt, Jr. | 210/289 |

(List continued on next page.)

FOREIGN PATENT DOCUMENTS

| | | |
|---|---|---|
| FR | 855252 | 5/1940 |
| SU | 1206233 A | 1/1986 |

OTHER PUBLICATIONS

"Operation of Wastewater Treatment Plants"; Manual of Practice No. 11; Prepared under Direction of the Technical Practice Committee; Water Pollution Control Federation, Washington, D.C., 1976, pp. ii, v, 307,308,309,318,319,322.
"The Original Vacuum Sludge DeWatering Bed" U.S. Environmental Products, Inc. 1985.
"Operation of Wastewater Treatment Plants" vol. II.; A Field Study Training Program–EPA–pp. 46, 47, 48, 49, 50, 51.

*Primary Examiner*—Christopher Upton
(74) *Attorney, Agent, or Firm*—Baker, Donelson, Bearman & Caldwell

(57) ABSTRACT

A vessel (10) for placement on a land site for sanitary treatment of wastewater, in which an inlet communicates wastewater and suspended solids through a mixing chamber (30) to an aeration zone (34) that receives air from nozzles (37) for biological digestion of the suspended solids and conversion to activated sludge. The activated sludge communicates through an airlift (70) to the mixing chamber (30) for facilitating treatment. The air from the nozzles (37) creates an upflow of wastewater and activated sludge to secondary clarifiers (42) having sludge receiving plates (48) on which the sludge settles, accumulates, and falls from resulting in treated water in the secondary clarifier (42). The treated water discharges in a trough (62) from the vessel (12, 92). A method of sanitary treating of wastewater is disclosed.

6 Claims, 3 Drawing Sheets

U.S. PATENT DOCUMENTS

| | | | |
|---|---|---|---|
| 4,190,539 A | 2/1980 | Besik | 210/195.4 |
| 4,259,182 A | 3/1981 | Belveal | 210/626 |
| 4,259,185 A | 3/1981 | Mixon | 210/195.3 |
| 4,576,720 A | 3/1986 | Mandt | 210/626 |
| 4,752,402 A | 6/1988 | Gray | 210/747 |
| 5,232,599 A | 8/1993 | Cole | 210/609 |
| 5,536,420 A | 7/1996 | Ozyboyd | 210/804 |
| 5,630,936 A | 5/1997 | Ozyboyd | 210/195.3 |
| 5,688,400 A | 11/1997 | Baxter, Sr. | 210/195.3 |
| 5,766,459 A | 6/1998 | Adams, Jr. | 210/195.4 |
| 5,954,953 A | 9/1999 | Gut et al. | 210/195.3 |
| 6,224,773 B1 * | 5/2001 | Adams, Jr. | 210/195.4 |

* cited by examiner

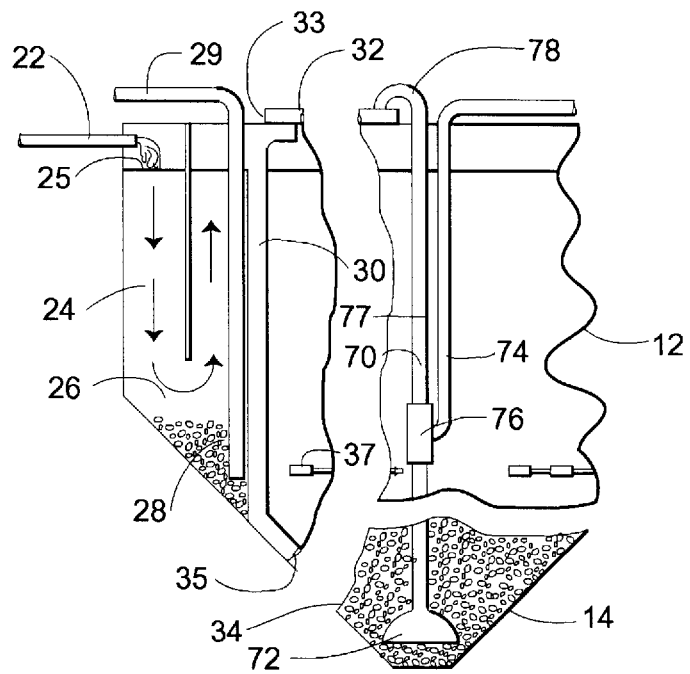
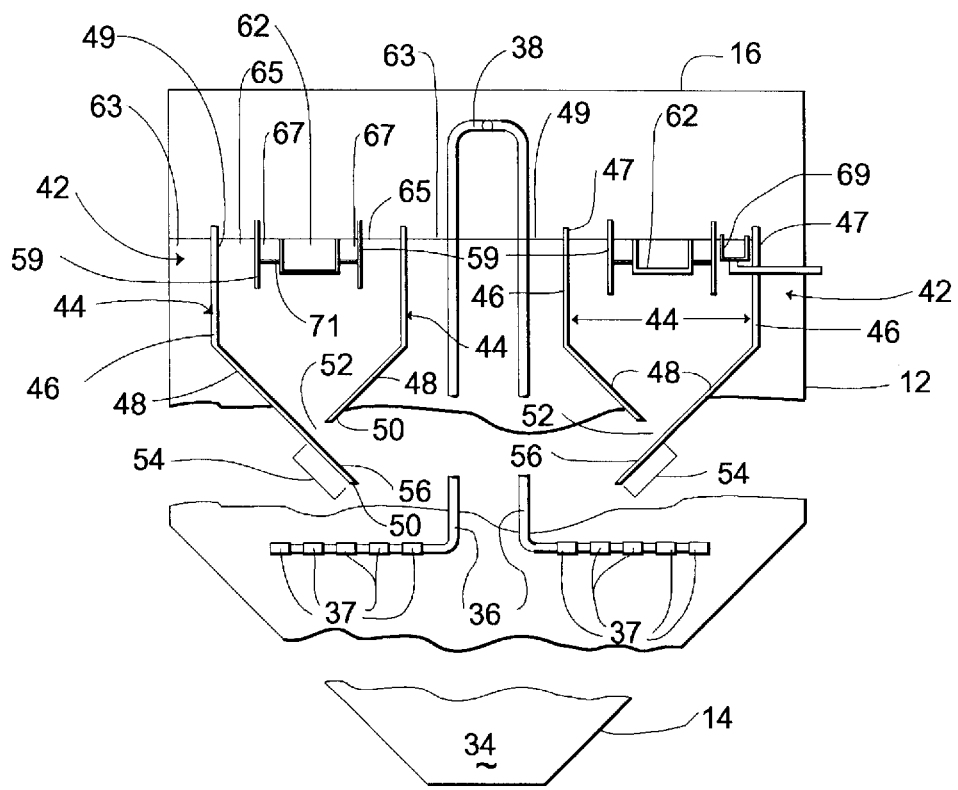

INTEGRATED VERTICAL WASTEWATER TREATMENT VESSEL AND METHOD

The present invention is a continuation-in-part of application Ser. No. 09/385,662, filed Aug. 26, 1999, now U.S. Pat. No. 6,120,687, incorporated herein by reference.

TECHNICAL FIELD

The present invention relates to wastewater treatment facilities. More particularly, the present invention relates to modular wastewater treatment apparatus for treating wastewater while reducing the amount of sludge produced per unit of wastewater treated.

BACKGROUND OF THE INVENTION

Conventional wastewater treatment facilities are large complexes for handling tens of millions of gallons of wastewater annually. These facilities produce clean water, yet also produce significant volumes of solidified waste sludge. Disposal of the waste sludge requires handling and disposal such as in landfills or other sources.

In a typical wastewater treatment plant, the influent passes through a series of treatment processes to remove large objects and then reduce the solids and waste particles before separating residual solids from the water. A headworks provides screening and grit removal. Screening removes roots, rags, cans and large debris from the flow of influent. A low-flow section facilitates removal of grit and heavy particulates. Primary treatment includes pre-aeration with air to freshen the wastewater and help remove oils that form scum on an upper surface of the water. This primary treatment accordingly combines sedimentation and floatation in order to remove settleable and floatable materials. Thereafter, secondary treatment removes suspended and dissolved solids. The secondary treatment typically involves treatment of wastewater with activated sludge in which biologically active microorganisms assimilate waste materials. Subsequently, disinfection kills pathogenic organisms in the clarified wastewater. The resulting effluent is then generally discharged to surface waters.

In treatment facilities that use activated sludge for wastewater treatment, raw wastewater is mixed in a first aeration tank with return activated sludge. This activated sludge typically comprises relatively high concentrations of biologically active microorganisms. These organisms consume the waste products to reduce the volume of solids in the wastewater. The term "return activated sludge" comes from the source of such, a secondary clarifier, in which the microorganisms become highly concentrated. In the secondary clarifier, microorganisms and waste collect into large clumps of material known as floc. Activated sludge floc separates from the water by gravitational force and sinks towards a bottom portion of the secondary clarifier. A portion of the activated sludge is returned to the first aeration tank for mixture with raw highly concentrated influent wastewater. Finally, the separated clear water is removed to a disinfecting tank for disinfection and subsequent discharge with microorganisms to surface waters.

Activated sludge is typically measured in terms of biochemical oxygen demand (BOD) in terms of milligrams per liter (mg/l). This measures the strength of the wastewater and the primary food source for the microorganisms. The clarity of the wastewater is also evaluated in terms of total suspended solids (TSS). Domestic wastewater typically is about 250 mg/l BOD and 200 mg/l TSS. However, return activated sludge solids concentrations typically ranges between 2000 and 6000 mg/l TSS. Plant effluent is typically 10 mg/l for both TSS and BOD.

Periodically, the accumulated sludge is discharged to a dewatering facility such as a sludge lagoon or a drying bed. My U.S. Pat. No. 5,536,420 describes a vertical drainage drying bed for waste sludge. Drying beds in accordance with that invention significantly reduce the time required to remove excess water from the sludge. Dried sludge is removed from the drying bed with heavy equipment and may be used as a low-grade fertilizer.

While large scale water treatment facilities have met the need for major metropolitan areas to satisfactorily treat wastewater prior to discharge to streams and lakes, these large scale facilities are significantly expensive. In recent years, environmental concerns have increased the regulatory oversight and rules governing wastewater treatment and discharge. Smaller communities are now finding it imperative that wastewater be treated prior to discharge into streams and rivers. Natural percolation of wastewater is no longer satisfactory. However, the expense of construction and operation of large scale wastewater treatment facilities has significantly increased the costs of such.

Accordingly, there is a need in the art for an low capacity modular wastewater treatment apparatus. It is to such that the present invention is directed.

SUMMARY OF THE PRESENT INVENTION

The present invention meets the need for an improved modular wastewater treatment facility by providing an integrated vertical wastewater treatment apparatus for placement as a modular unit on a land site to treat influent wastewater. The modular apparatus comprises a vessel having a closed bottom and an open upper end. The lower portion of the vessel defines an aeration zone for receiving a flow of influent wastewater with suspended solids for sanitary treatment. The influent wastewater communicates from an inlet through a mixing chamber into the aeration zone. A plurality of nozzles disposed within the aeration zone communicate with a supply of low-pressure air for injecting oxygen into the aeration zone to facilitate biological digestion of the suspended solids in the wastewater for sanitary treatment and the conversion of the suspended solids into activated sludge. An airlift has an inlet at a first end that communicates with a portion of the aeration zone in which the activated sludge gathers in concentration. The airlift has an outlet at a second opposing end. The airlift communicates with a supply of pressurized air to create a flow of concentrated activated sludge by a plurality of air bubbles moving from an air inlet through an uplift tube of the airlift. The mixing chamber in the vessel receives the flow of the wastewater with the suspended solids from the inlet and the concentrated activated solids from the aeration zone from the uplift tube. A secondary clarifier in a portion of the vessel superior to the aeration zone receives a flow of wastewater and sludge from the aeration zone by influence of the plurality of air bubbles introduced through the nozzles in the aeration zone. The secondary clarifier comprises a pair of opposing baffles and each baffle has a sludge receiving plate disposed at an oblique angle relative to the respective baffle and downwardly extending towards the opposing baffle to define a gap between lower distal end portions through which the wastewater and activated sludge flow into the secondary clarifier. One of the receiving plates extends past the opposing receiving plate to define a threshold to the secondary clarifier. The baffles cause a stilling of the wastewater in the secondary clarifier while the sludge deposits settlingly on the receiving plates where it accumulates and falls by mass into the aeration zone, resulting in treated water separated from the activated sludge. A trough disposed in the secondary clarifier for receives treated water separated from the sludge in the secondary clarifier which treated water communicates through an outlet outwardly of the treatment apparatus.

In another aspect, the present invention provides a method of treating sanitary and industrial wastewater in an integrated vertical-processing apparatus placed as a modular unit on a land site, comprising the steps of:

(a) providing through an inlet a flow of influent wastewater having at least suspended solids for sanitary treatment into an aeration zone in a lower portion of a vessel having a closed bottom and an open upper end;

(b) injecting a plurality of air bubbles through a plurality of nozzles disposed in the aeration zone, the nozzles communicating with a supply of low-pressure air to facilitate biological digestion of the suspended solids in the wastewater for sanitary treatment and the conversion of the suspended solids into activated sludge;

(c) communicating a flow of concentrated activated sludge and wastewater from a portion of the aeration zone in which the activated sludge gathers in concentration through an airlift having an inlet at a first end therein and an outlet at a second opposing end, the airlift communicating with a supply of pressurized air to create the flow of concentrated activated sludge by a plurality of air bubbles moving from an air inlet through an uplift tube of the airlift;

(d) introducing into the mixing chamber the concentrated activated solids from the aeration zone from an outlet of the uplift tube, whereby the activated solids mix with the influent wastewater;

(e) communicating the wastewater and the activated sludge to a secondary clarifier in a portion of the vessel superior to the aeration zone by influence of the plurality of air bubbles introduced through the nozzles in the aeration zone, the secondary clarifier comprising a pair of opposing baffles and each baffle having a sludge receiving plate disposed at an oblique angle relative to the respective baffle and extending towards the opposing baffle to define a gap between lower distal end portions for the wastewater and sludge to flow into the secondary clarifier, with one of the receiving plates extending past the opposing receiving plate to define a threshold to the secondary clarifier, the baffles causing a stilling of the wastewater in the secondary clarifier with the sludge being deposited settlingly on the receiving plates where it accumulates and then falls by mass into the aeration zone, resulting in treated water separated from sludge; and (f) communicating treated water separated from the sludge in the secondary clarifier to an outlet.

Objects, features, and advantages of the present invention will become apparent from a reading of the following specifications, in conjunction with the drawings and the appended claims.

BRIEF DESCRIPTION OF THE DRAWINGS

FIG. 2 is a detailed cross-sectional side view of an influent and mixing portion of the wastewater treatment vessel illustrated in FIG. 1.

FIG. 3 is a detailed cross-sectional side view of a secondary clarifier portion of the wastewater treatment vessel illustrated in FIG. 1.

DETAILED DESCRIPTION OF THE PREFERRED EMBODIMENTS

Figure 1:
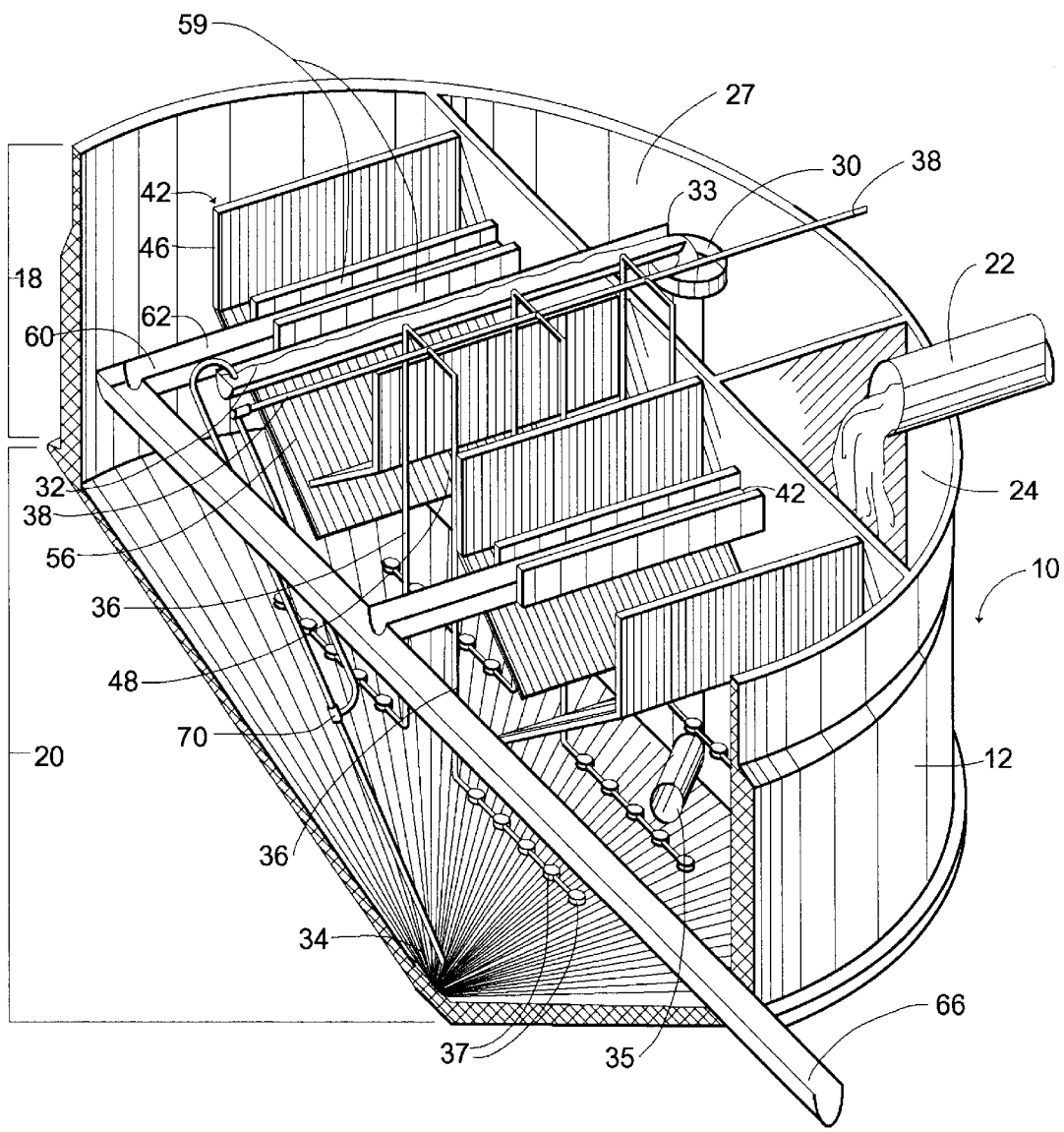
FIG. 1 is a perspective cut-away view of an integrated vertical wastewater treatment vessel according to the present invention.

Referring now in more detail to the drawings, in which like numerals indicate like parts throughout the several view, FIG. 1 shows in perspective view an embodiment of an integrated vertical wastewater treatment apparatus 10 according to the present invention. The apparatus 10 comprises an enlarged vessel 12 having a closed bottom 14 and an open upper end 16. The vessel 12 is preferably a concrete or steel structure having an overall height of between 18 and 27 feet and a diameter of between about 14 to 22 feet, depending upon the treatment capacity desired, although the vessel 12 is selectively sized. Although not illustrated, the vessel 12 is preferably disposed within the ground with an upper edge portion extending above grade.

In the illustrated embodiment, the vessel 12 has an upper cylindrical portion 18 and a tapered conical lower portion 20. An inlet 22 communicates a flow of influent wastewater into the vessel for sanitary treatment. The inlet 22 communicates to an open-ended grit collection chamber 24 (best illustrated in FIG. 2). The grit collection chamber 24 is open at both an upper end 25 and a lower end 26. A collection basin 28 is defined below the lower open end 26. The collection basin 28 receives particulate matter, such as grit or sand from the influent wastewater. Non-organic materials separate from organic solid wastes. FIG. 2 illustrates an airlift 29 that has a lower end in the collection basin 28 and a discharge (not illustrated) outwardly of the vessel 12. The airlift 29 receives air from a supply for creating an uplift in the airlift 29 to remove the material collected in the basin 28.

The open end 26 of the grit collection chamber 24 communicates with an intermediate tank 27 in which a mixing chamber 30 is held. Wastewater in the intermediate tank 27 enters the open upper end of the mixing chamber. A trough 32 has an open end 33 which communicates with the mixing chamber 30. As discussed below, the trough 32 communicates return concentrated activated sludge from an aeration zone 34 in a lower portion of the vessel 12 to the mixing chamber 30. The mixing chamber 30 has an open discharge end 35 which communicates with the aeration zone 34. The mixing chamber 30 in the illustrated embodiment is an elongate pipe having a diameter of 8 inches.

With reference to FIGS. 1 and 3, a plurality of spaced-apart headers 36 are disposed in the aeration zone 34. The headers 36 include a plurality of diffusers 37 that define openings through which streams of air pass. The headers 36 communicate through pipes 38 to a source of low pressure air, such as a pump (not illustrated). The discharge 35 of the mixing chamber 30 is disposed vertically below the depth of the diffusers 37. In the illustrated embodiment, the discharge is 24 inches deeper than the diffusers.

The upper portion of the vessel 12 includes at least one secondary clarifier generally designated 42 which mounts to the vessel with support members and brackets (not illustrated). Preferably the vessel 12 includes two secondary clarifiers 42. The secondary clarifier 42 defines a portion of the vessel having relatively low-flow currents of the wastewater, whereby suspended solids can settle from the water. The secondary clarifier 42 comprises a pair of opposing baffles 44. Each baffle 44 comprises a side plate 46 and a bottom plate 48. The side plates 46 have a portion 47 partially extended above a surface 49 of the wastewater in the vessel 12. The bottom plates 48 angle downwardly at an oblique angle relative to horizontal and towards the opposing baffle. The distal edges 50 of the respective plates 48 do not touch; rather, the distal edges are spaced apart to define a gap 52 therebetween. In the illustrated embodiment, the gap 52 is six inches. A portion 54 of one of the plates 48 extends past the opposing plate and defines a threshold 56 for the secondary clarifier. In the illustrated embodiment, the threshold 56 extends 12 inches beyond the gap 52. The bottom plates 48 angle downwardly relative to vertical in a range of between about 130° and 150°, with a preferred angle of about 135°. In the illustrated embodiment, fences 59 are disposed parallel to and offset from the side plates 46. Such double fences improves operation and minimizes solids channeling and rebound during processing of wastewater and suspended solids in the secondary clarifiers 42, as discussed below. Preferably, the fences 59 are stainless steel, although other rigid materials such as plastic could be used.

An effluent discharge 60 comprising an elongate trough 62 mounts within the secondary clarifier 42. The trough 62 has opposing side walls 64 that partially extend above the surface of the wastewater. Wastewater flows over the upper edges of the side walls into the trough 62, as discussed below. The secondary clarifiers 42 define agitation zones 63, skim zones 65, and still zones 67, for purposes discussed below. The discharge 60 communicates with an effluent trough 66 for discharging treated water from the apparatus 10. A conventional skimmer 69 is disposed in the skim zone 65. The fences 59 connect to the trough 62 by a plurality of spaced apart supports 71, which permits wastewater flow from the skim zone 65 to the still zone 67.

An airlift 70 has an inlet 72 (best illustrated in FIG. 2) disposed deep within the aeration zone 34 near a bottom of the vessel 12. My U.S. Pat. No. 5,630,936 describes an improved airlift for communicating accumulated waste sludge from a lower portion of a sludge collection area in a sewage treatment facility. The airlift 70 includes an air supply pipe 74 which communicates to a manifold 76 having a plurality of openings through which the air passes into an uplift tube 77. An upper end 78 of the uplift tube 77 communicates with the trough 32 which communicates return sludge from the aeration zone 34 to the mixing chamber 30.

The modular sanitary treatment apparatus 10 of the present invention provides an apparatus and method for treating wastewater with a substantially vertical process flow to treat wastewater and to reduce the amount of sludge produced per unit of wastewater treated. This is accomplished by cycling the biologically active organisms to consume solids waste while increasing the concentration of such organisms until a selected concentration is reached when the resulting sludge is disposed of. With reference to FIGS. 1 and 2, raw influent wastewater is provided through the inlet 22 to the grit collecting chamber 24. This chamber significantly reduces the flow rate of the influent. The reduction in flow rate permits particulate grit, such as sand and other heavy solid particulates, to settleout of the influent and gather in the collection basin 28. The airlift 29 evacuates the collected grit to the discharge outwardly of the vessel 12. The wastewater carrying suspended solids moves at the low flow rate through the opening 26 into intermediate tank 27. Wastewater flows at the surface into the open end of the mixing chamber 30. The wastewater with the suspended solids mixes in the mixing chamber 30 with a concentrated activated sludge received through the conduit 32. The activated sludge initiates the digestion of the suspended solids. The mixture communicates to the aeration zone 34 through the opening 35 below the depth of the diffusers 27.

Low pressure air communicates from the source, such as a pump, through the pipes 38 to the headers 34 for communication into the waster water through the diffusers 37. The diffusers 37 release the air as streams of bubbles into the aeration zone 34. Several actions occur in the aeration zone 34 and the secondary clarifiers 42. Oxygen from the air is provided by the diffusers 37 to the wastewater. The oxygen is used by the microorganisms therein that feed on the suspended solids, other waste materials, and other microorganisms in the influent being treated. Preferably, the temperature of the wastewater in the areation zone is about 20° C. Heavy clumps of microorganisms and waste solids called floc, fall through the aeration zone 34 towards the bottom of the vessel 12. The floc comprises concentrated activated sludge. The floc collects along the tapered walls of the conical portion 20 and slides towards the apex at the bottom of the vessel 12. The bubbles of air released from the diffusers 37 however create an upward flow of the wastewater and the lighter suspended solids. Sludge gently flows upwardly at about 0.07 mm/sec. The upward flow of the wastewater and suspended solids moves gently through the gap 52 into the secondary clarifier 42. The threshold 56 generally blocks the air bubbles from the diffusers 37 below and directs the air bubbles laterally around the baffles 44 of the secondary clarifier 42. The bubbles stir and mix the wastewater in the agitation zones 63 around the secondary clarifiers 42. However, the upward flow causes some of the wastewater and suspended solids to enter the secondary clarifier 42.

With reference to FIGS. 1 and 2, the microorganisms and suspended solids in the secondary clarifiers 42 collect into the larger clumps of material or floc. The gentle rate of rising and the stilling of the wastewater within the still zone 65 allows the floe to settle on the plates 48. Preferably, the zone defined by the angled plates 48 at the bottom of the secondary clarifier 42 accounts for about 20% of the volume of the secondary clarifier. Microorganisms in the floe consume waste and other microorganisms, which reduces the solid waste. The process reduces solid waste to about 1.6 to 1.8 percent with an F/M ratio of about 0.29. As the floc becomes larger and heavier and accumulates due to reduced oxygen, the floe slides down the plates 48 and through the gap 52 towards the bottom of the vessel 12 into the lower aeration zone 42. The oxygen in the aeration zone provides biological support to the microorganisms which assimilate suspended solids in the waste materials. As the floe concentrates in the lower portion of the aeration zone 34, the microorganisms become less active and dormant as they are increasingly deprived of oxygen. The concentration of the biologically active microorganisms however increases towards the bottom of the vessel 12. Generally, sludge becomes more concentrated during the detention period in the vessel 12. Scum collects on the surface 49 in the skim zone 65 which is less agitated than the agitation zones 63. The skimmers 69 evacuate the scum and foam from the vessel 12. Treated wastewater in the still zones 67 flows over the sides of the trough 62. The treated wastewater flows through the discharge 66 outwardly of the vessel 12.

The airlift 70 induces an up-flow of the concentrated sludge from the lower portion of the vessel 12. The air flow into the manifold 76 creates lift in the tube 77. This lift pulls the waste activated sludge through the inlet 72 from the lower portion 34 of the vessel 12. The activated sludge moves through the uplift tube 77 which communicates with the trough 32 for discharge of the activated sludge into the mixing chamber 30.

The mixing chamber 30 preferably is a vertical pipe of about 8 to 10 inches in diameter. The mixing chamber 30 receives both the activated sludge from the lower portion of the vessel 12 from the trough 32 and the wastewater with the suspended solids from the intermediate tank 27. The activated sludge mixes with the wastewater and suspended solids while also moving through the opening 35 into the aeration zone 34. After the concentration of the activated sludge becomes high enough the trough 32 is moved to selectively communicate activated sludge to a drying bed for drying and disposal (not illustrated). My U.S. Pat. No. 5,536,420 describes a drying bed useful for drying activated sludge for disposal. Generally, the sluge is discharged to the drying bed when sludge concentrations reach about 6,000 to 7,000 mg/L.

Figure 4:
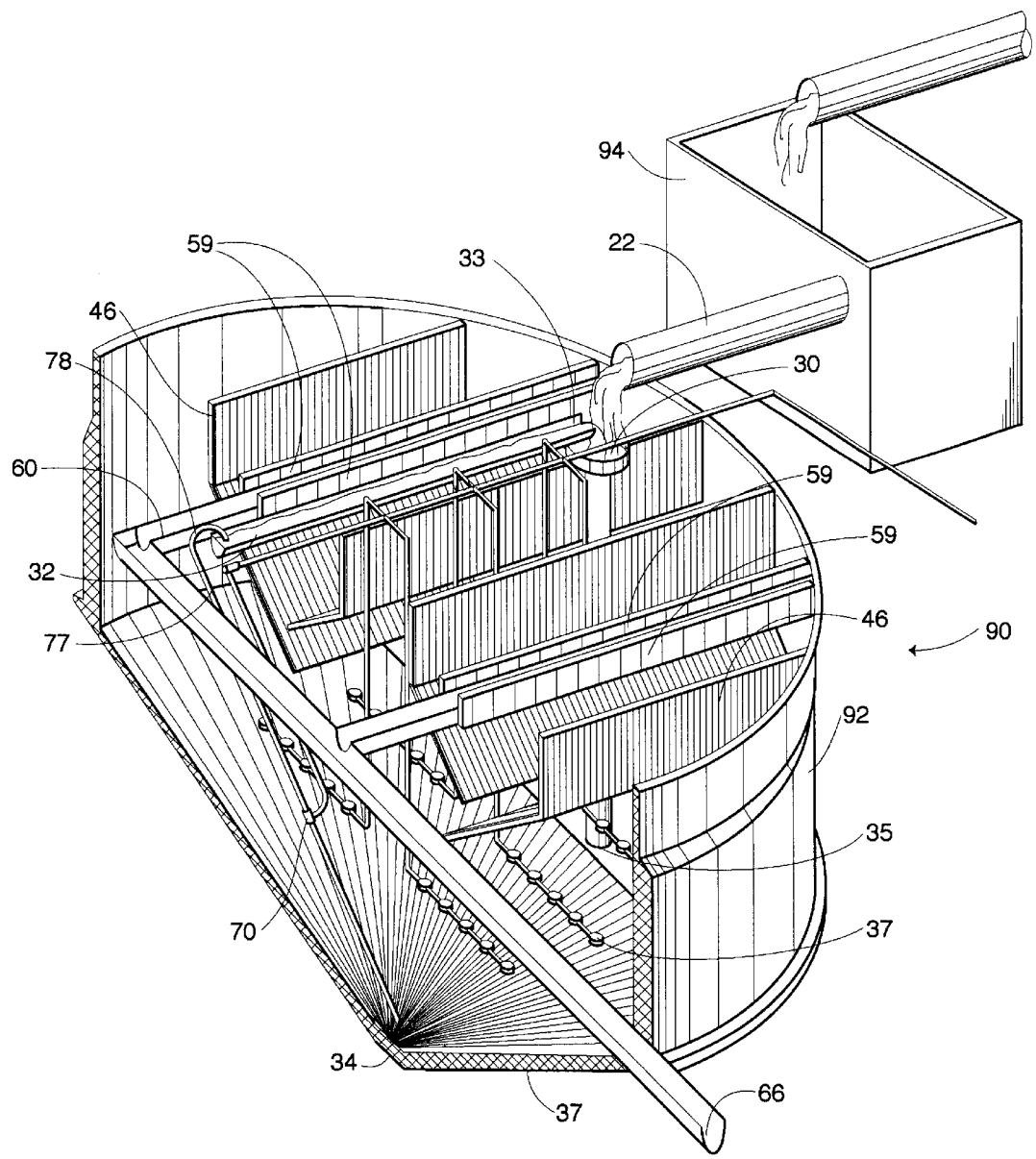
FIG. 4 is a perspective cut-away view of an alternate embodiment of the integrated vertical wastewater treatment vessel illustrated in FIG. 1.

FIG. 4 illustrates in perspective cut-away view an alternate embodiment of an integrated vertical wastewater treatment apparatus 90. The apparatus 90 comprises a vessel 92 modified from the vessel 12 discussed above. The modified vessel 92 has an inlet 22 that communicates a flow of influent wastewater with biologically active solids into the vessel for sanitary treatment. The vessel 92 differs from the vessel 12 illustrated in FIG. 1 in that the vessel 92 does not include the grit collection chamber 24 with the collection basin 28 for receiving particulate matter and nonorganic materials and the intermediate tank 27. Instead, the raw influent first passes through an exterior grit collection chamber 94 for settling of the particulate such as grit or sand from the influent wastewater. The resulting influent with suspended solids then communicates through the inlet pipe 22 into the vessel 92. The influent wastewater enters an open end of the mixing chamber 30 and flows through the discharge 35 into the aeration zone 34. The mixing chamber 30 also receives accumulated concentrated waste sludge from the lower portion 34 of the vessel 92 through the airlift 70. The upper end 78 of the uplift tube 77 deposits the sludge into the trough 32. The activated sludge flows though the trough 32 to the mixing chamber 30.

The alternative embodiment apparatus 90 thereby is suited for sanitary facilities having exterior grit and debris separation while gainfully using the substantially vertical process flow in a compact package for sanitary treatment of wastewater. The process of mixing influent with activated concentrated sludge cycling from the lower portion 34 of the vessel 92, separating treated water from suspended solids in the secondary clarifiers 42 that have the thresholds 56, and facilitating biologic treatment with the air bubbles in the aeration zone as well as using the air bubbles to direct microorganisms and solids into the secondary clarifiers 42 as discussed above with respect to FIG. 1, applies to the alternate embodiment 90 illustrated in FIG. 4.

It is to be appreciated that the mixing chamber 30 is a mixing balancing chamber which receives the influent wastewater and the accumulated concentrated waste sludge. The influent wastewater generally comprises suspended solids food material for digestion by microbes contained within the vessel 12, 92. The concentration activated sludge has a high percentage of active microorganisms. The influent of concentrated sludge can be adjusted in order to balance the food-to-microorganisms (F/M) ratio. This ratio is readily adjustable by varying the volume of activated concentrated sludge communicated to the mixing balancing chamber 30. The mixing balancing chamber thereby facilitates the initiation of the biologic treatment of the influent wastewater.

Thus, there has been described a first and second embodiment of the integrated vertical wastewater treatment apparatus having a substantially vertical process flow, which is readily manufactured in a steel or concrete vessel comprising a modular housing for ready installation in the ground with capacities particularly suited for small to medium volumes of between about 0.1 and 1.0 million gallons per day treatment of domestic and industrial wastewater. The vessel of the present invention is readily manufactured and delivered by a truck to a site for installation within the ground for treatment of wastewater. It is noted that several vessels 12, 92 connected in series are gainfully used to treat high concentrations of BOD and suspended solids in several steps of concentrations, from extremely high, to intermediate, and finally to extremely low concentrations. The vessels 12, 92 of the present invention reduce the land area requirements for wastewater treatment facilities, reduces manufacturing and site construction costs, with reduced maintenance and operating expenses. The principles, preferred embodiments, and modes of operation of the present invention have been described in the forgoing specifications. The invention is not to be construed as limited to the particular forms disclosed because these are regarded as illustrative rather than restrictive. Moreover, variations and changes maybe made by those skilled in the art without departing from the spirit of the invention as described by the following claims.

What is claimed is:

1. An integrated vertical wastewater treatment apparatus for placement as a unit on a land site to treat influent wastewater, comprising:

a vessel having a closed bottom and an open upper end;

an inlet for communicating a flow of influent wastewater having suspended solids through a mixing chamber into a lower portion of the vessel therein for sanitary treatment;

an aeration zone in the lower portion of the vessel for receiving the flow of the wastewater with the suspended solids for treatment;

a plurality of nozzles disposed within the aeration zone and communicating with a supply of low-pressure air for injecting oxygen into the aeration zone to facilitate biological digestion of the suspended solids in the wastewater for sanitary treatment and the conversion of the suspended solids into activated sludge;

an airlift having an inlet at a first end communicating with a portion of the aeration zone in which the activated sludge gathers in concentration, the airlift having an outlet at a second opposing end, the airlift communicating with a supply of pressurized air to create a flow of concentrated activated sludge by a plurality of air bubbles moving from an air inlet through an uplift tube of the airlift;

the mixing chamber receiving the flow of the wastewater with the suspended solids and concentrated activated solids from the aeration zone from an outlet of the uplift tube;

a secondary clarifier in a portion of the vessel superior to the aeration zone for receiving a flow of wastewater and sludge from the aeration zone by influence of the plurality of air bubbles introduced through the nozzles in the aeration zone, the secondary clarifier comprising a pair of opposing baffles and each baffle having a sludge receiving plate disposed at an oblique angle relative to the respective baffle and extending towards the opposing baffle to define a gap between lower distal end portions for the wastewater and sludge to flow into the secondary clarifier, with one of the receiving plates extending past the opposing receiving plate to define a threshold to the secondary clarifier, the baffles causing a stilling of the wastewater in the secondary clarifier while the flow of the wastewater induced by the air bubbles carries the wastewater and the suspended solids into the secondary clarifier with the sludge being deposited settlingly on the receiving plates where it accumulates and falls by mass into the aeration zone, resulting in treated water separated from sludge;

a trough disposed in the secondary clarifier for receiving treated water separated from the sludge in the secondary clarifier; and a treated water outlet communicating with the trough for directing the treated water outwardly of the treatment apparatus.

2. The integrated vertical wastewater treatment apparatus recited in claim 1, further comprising an open-ended grit collecting chamber for separation of settleable grit particulates from the influent, which grit collecting chamber receives at a first end influent wastewater from the inlet and having a collection basin at an opposing end for receiving grit particulates that settle from the influent wastewater in the grit collecting chamber into the collection basin, the grit collecting chamber defining an outlet for communicating a flow of wastewater with the suspended solids from the grit collecting chamber.

3. The integrated vertical treatment apparatus as recited in claim 1, wherein the vessel comprises a cylindrical upper portion and a tapered conical lower portion.

4. The integrated vertical wastewater treatment apparatus as recited in claim 1, wherein the downward angle of the receiving plates relative to vertical is in a range of between about 130° and 150°.

5. A method of sanitary wastewater treatment in an integrated vertical apparatus placed as a modular unit on a land site to treat influent wastewater, comprising the steps of:

(a) providing through an inlet a flow of influent wastewater having suspended solids therein for sanitary treatment into a vessel having a closed bottom and an open upper end;

(b) injecting a plurality of air bubbles through a plurality of nozzles disposed in an aeration zone in a lower portion of the vessel which lower portion receives the flow of the wastewater with the suspended solids for treatment, the nozzles communicating with a supply of low-pressure air to facilitate biological digestion of the suspended solids in the wastewater for sanitary treatment and the conversion of the suspended solids into activated sludge;

(c) communicating a flow of concentrated activated sludge and wastewater from a portion of the aeration zone in which the activated sludge gathers in concentration through an airlift having an inlet at a first end therein and an outlet at a second opposing end, the airlift communicating with a supply of pressurized air to create the flow of concentrated activated sludge by a plurality of air bubbles moving from an air inlet through an uplift tube of the airlift;

(d) introducing into a mixing chamber the flow of the wastewater with the suspended solids from the outlet of the grit collecting chamber and the concentrated activated solids from the aeration zone from an outlet of the uplift tube, whereby the inflow are mixed together;

(e) communicating the wastewater and the activated sludge to a secondary clarifier in a portion of the vessel superior to the aeration zone by influence of the plurality of air bubbles introduced through the nozzles in the aeration zone, the secondary clarifier comprising a pair of opposing baffles and each baffle having a sludge receiving plate disposed at an oblique angle relative to the respective baffle and extending towards the opposing baffle to define a gap between lower distal end portions for the wastewater and sludge to flow into the secondary clarifier, with one of the receiving plates extending past the opposing receiving plate to define a threshold to the secondary clarifier, the baffles causing a stilling of the wastewater in the secondary clarifier with the sludge being deposited settlingly on the receiving plates where it accumulates and then falls by mass into the aeration zone, resulting in treated water separated from sludge; and (f) communicating treated water separated from the sludge in the secondary clarifier to an outlet.

6. The method as recited in claim 5, further comprising the step of separating settleable grit particulates from the influent wastewater in an open-ended grit collecting chamber that receives at a first end influent wastewater and having a collection basin for receiving grit particulates that settle from the influent wastewater and defining an outlet for communicating a flow of wastewater with the suspended solids from the grit collecting chamber.

* * * * *